US006618665B2

(12) United States Patent
Walker et al.

(10) Patent No.: US 6,618,665 B2
(45) Date of Patent: Sep. 9, 2003

(54) COLD START PULSE WIDTH COMPENSATION

(75) Inventors: Robert S. Walker, Carol Stream, IL (US); Michael M. Beyene, Chicago, IL (US); Suresh L. Satyavolu, Hillside, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 09/821,477

(22) Filed: Mar. 29, 2001

(65) Prior Publication Data
US 2002/0143458 A1 Oct. 3, 2002

(51) Int. Cl.[7] .......................... G06F 19/00; F02D 41/08
(52) U.S. Cl. ...................... 701/104; 701/105; 701/110; 701/114; 123/478; 123/480
(58) Field of Search ................. 701/104, 105, 701/102, 110, 113, 114; 123/479, 480, 478, 491

(56) References Cited

U.S. PATENT DOCUMENTS

| 4,034,720 A | * | 7/1977 | Noguchi et al. ............ 123/275 |
| 4,193,380 A | | 3/1980 | Marchak et al. |
| 4,543,937 A | | 10/1985 | Amano et al. |
| 4,911,131 A | * | 3/1990 | Nakaniwa et al. .......... 123/478 |
| 5,054,450 A | * | 10/1991 | Oota et al. .................. 123/478 |
| 5,289,809 A | | 3/1994 | Kamiya et al. |
| 5,560,339 A | | 10/1996 | Yoshioka et al. |
| 5,564,406 A | | 10/1996 | Klein |
| 6,092,496 A | | 7/2000 | Bhargava et al. |

FOREIGN PATENT DOCUMENTS

GB          2 341 241 A          8/1999

OTHER PUBLICATIONS

Patent Abstracts of Japan, vol. 016, No. 339 (M–1284), Jul. 22, 1992 & JP 04 101030 A (Japan Electron Control Syst. Co., Ltd.), Apr. 1, 1992.

* cited by examiner

*Primary Examiner*—Hieu T. Vo
(74) *Attorney, Agent, or Firm*—Dennis Kelly Sullivan; Susan L. Lukasik; Jeffrey P. Calfa

(57) ABSTRACT

An internal combustion engine control system processes data to develop desired fueling data representing a desired amount of fuel that is to be injected into the engine for combustion. The desired fueling data is modified by a multiplier during a cranking, starting, and initial running phase of the engine, and after the engine has started and begins running, modifies the multiplier by a multiplier adder. Use of the multiplier added is discontinued once the engine fuel injectors have sufficiently warmed up. The multiplier adder is a function of an average of desired fueling data taken over a time interval that includes engine cranking, starting, and initial engine running.

22 Claims, 5 Drawing Sheets

COLD START PULSE WIDTH COMPENSATION

FIELD OF THE INVENTION

This invention relates generally to internal combustion engines having processor-based electronic controls that control the operation of electric-actuated fuel injectors that inject fuel into engine combustion chambers. More particularly the invention relates to an improvement in the compensation of signals for operating the fuel injectors at engine starting and initial running, such as at a cold start.

BACKGROUND OF THE INVENTION

A known electronic engine control system comprises a processor-based engine controller that processes various data to develop fueling data for the engine. The fueling data represents an amount of fuel that is to be introduced into the engine for combustion. A known control system further includes an injector control, or injector driver, module for operating fuel injectors that inject fuel into the engine in amounts corresponding to the fueling data. The fueling data is supplied to the injector control module from the engine controller, and the injector control module may have its own processor for making certain adjustments to the supplied data to develop proper data for causing the fuel injectors to inject fuel in amounts corresponding to the fueling data calculated by the engine controller. Adjustment may be made for any one or more of various reasons, certain of which will be discussed herein in connection with disclosure of the present invention.

The injector control module also comprises injector drivers each of which delivers an electric current signal to an electric actuator of the respective fuel injector to cause an injection of fuel. The signal that is applied to a fuel injector actuator from the respective driver is typically a pulse width modulated signal wherein the width of each applied pulse essentially determines the amount of fuel that the fuel injector injects into the corresponding engine cylinder in consequence of that pulse.

One reason for the injector control module to make an adjustment of the fueling data that is supplied to it is to compensate for certain characteristics of the specific fuel injectors. Another reason is to compensate for certain prevailing conditions such as state of the engine and ambient effects, such as temperature.

When the fueling data received by the injector control module represents the width of an electric pulse that is intended to cause a corresponding amount of fuel to be injected, the ability to successfully start an engine may involve a modification of that fueling data to cause the actual pulse width applied to a fuel injector to differ from the width that corresponds to the received fueling data. For example, the fueling data supplied to the injector control module may represent a certain pulse width based on a particular set of prevailing conditions. However, a set of conditions that prevail when an engine is being cranked, then starts, and then begins to run, may be sufficiently different from the set on which the calculated fueling data is premised that the supplied fueling data must be adjusted by the injector control module in order to assure that the actual fueling indeed corresponds to the supplied fueling data.

A prior method for adjusting the fueling data for such conditions comprises using a steady state multiplier based on injection control pressure and on engine oil temperature as a measure of engine operating temperature. While multiplication of pulse width by such a multiplier may be effective for cranking and initial starting of an engine over a range of temperatures, it requires some adjustment as the engine begins to run and warms up.

SUMMARY OF THE INVENTION

The present invention relates to an engine control system that comprises a processor, wherein the processor calculates desired fueling data for an engine and a multiplier is used to adjust, or compensate, the calculated fueling data before that data is allowed to act on a fuel injector. The invention comprises a novel strategy for modifying and using the multiplier in a way that accounts for various conditions that affect the cranking, starting, and initial running of an engine so that the fuel actually injected more closely corresponds with the calculated fueling data for various sets of prevailing conditions that could otherwise cause actual fueling to differ significantly from desired fueling. The invention also accounts for changing fuel injector characteristics as they warm up.

Without the present invention, an engine control system may experience a situation during initial engine running where the influence of the governor portion of the control system on the fueling data calculation may cause rather substantial variation in the fueling data, including periodically calculating zero fueling. This substantial variation in calculated fueling data in turn may cause substantial variation in engine idle speed as the engine warms up. Such substantial variation in engine idling is considered undesirable, especially in an automotive vehicle, because the driver may consider it objectionable or even perceive it as a problem with the engine. With the present invention the calculated fueling data does not fluctuate over as wide a range, and as a result, there is less fluctuation in engine idle speed as the engine warms up.

A generic aspect of the present invention relates to an internal combustion engine comprising a processor-based engine control system, and a fueling system that fuels the engine under control of the engine control system. The control system processes data to develop desired fueling data representing a desired amount of fuel for fueling the engine, modifies the desired fueling data by a multiplier during cranking, starting, and initial running phases of the engine, causes the fueling system to fuel the engine according to the modified desired fueling data during the cranking, starting, and initial running phases of the engine, and thereafter modifies the multiplier by a multiplier adder and causes the fueling system to fuel the engine according to the modified desired fueling data as further modified by the multiplier adder. Another generic aspect relates to this method of fueling the engine.

Still another generic aspect relates to an internal combustion engine comprising a processor-based engine control system, and a fueling system that fuels the engine under control of the engine control system. The control system processes data to develop desired fueling data representing a desired amount of fuel for fueling the engine, modifies the desired fueling data by a modifier and causes the fueling system to fuel the engine according to the modified desired fueling data during cranking, starting, and initial running phases of the engine, and thereafter further modifies the modifier by a further modifier derived from averaging desired fueling data taken over a time interval that includes time prior to the initial running phase of the engine and causes the fueling system to fuel the engine according to the further modified modifier. Another generic aspect relates to this method of fueling the engine.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
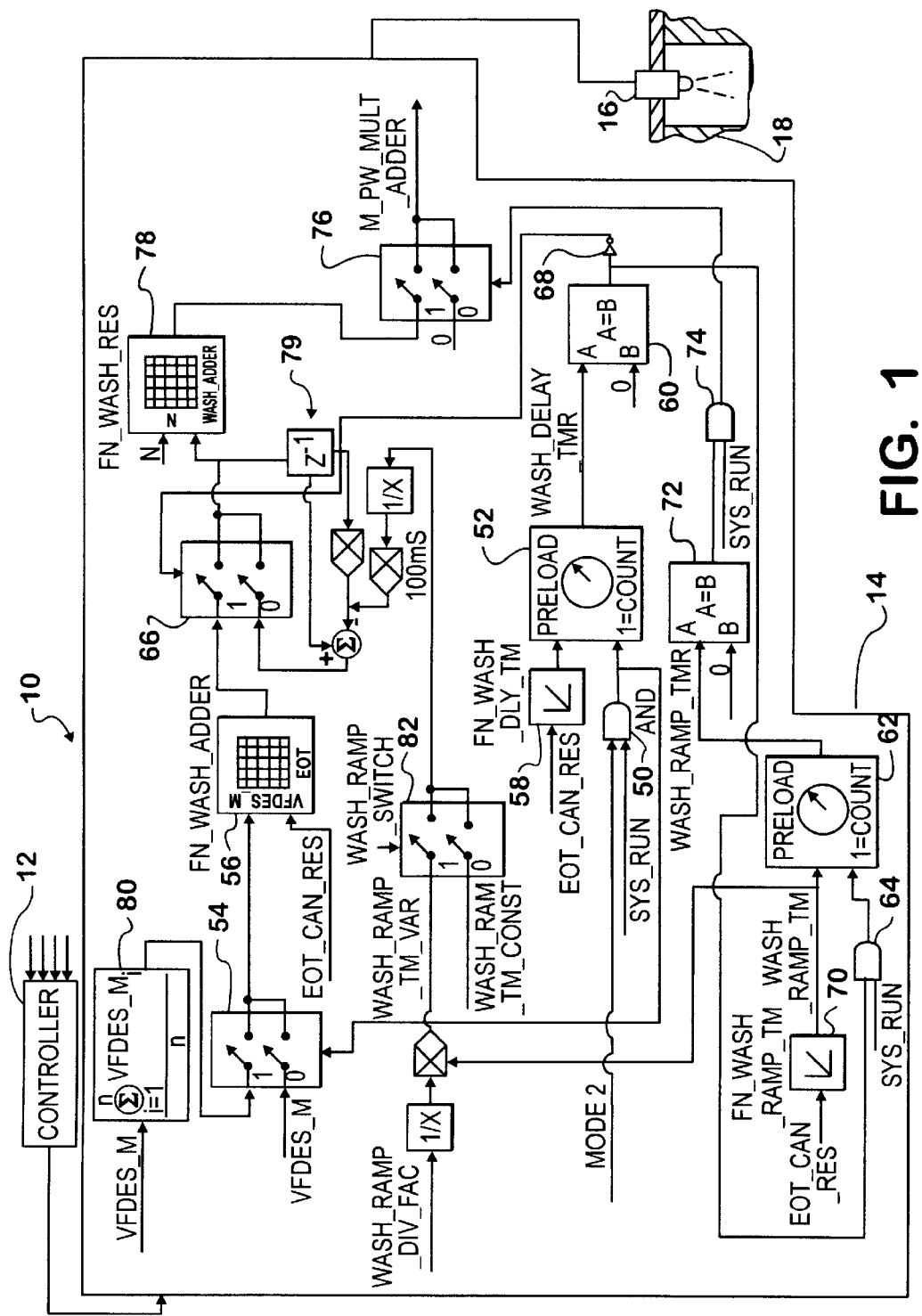
FIG. 1 is a schematic diagram of an exemplary embodiment of the present invention.

FIG. 1 shows a software specification diagram depicting implementation of an algorithm in an engine control system 10 according to principles of the present invention. Control system 10 comprises a processor-based controller 12 and an injector control module 14 for controlling the operation of electric-actuated fuel injectors 16 that inject fuel into engine combustion chambers of an internal combustion engine 18, such as in a multi-cylinder, compression-ignition internal combustion engine that powers an automotive vehicle. Although FIG. 1 shows an arrangement for only one cylinder, there is a respective fuel injector 16 for each cylinder. Each fuel injector comprises a body that is mounted on the engine and has a nozzle through which fuel is injected into the corresponding engine cylinder.

Controller 12 operates each fuel injector 16 via a respective driver circuit (not shown) in injector control module 14. The processor of controller 12 processes various items of data to develop data representing desired quantities of fuel to be injected by the individual fuel injectors. Such data will be referred to as desired fueling data. The desired fueling data is supplied to injector control module 14, which may perform further processing of the supplied data to develop data that is in turn converted to corresponding electric signals for the injector drivers that operate the fuel injectors.

Each fuel injector 16 comprises an electric actuator that operates an injection mechanism. A fuel injection from an injector is initiated by an initiating electric signal applied to the actuator by the respective driver circuit. The fuel injection terminates when the electric signal changes to a terminating electric signal. The initiating electric signal may be the leading edge of a rectangular pulse, and the terminating signal, the trailing edge. The time between the edges is the pulse width, which may be modulated according to the amount of fuel to be injected. Therefore, when a pulse width modulated signal is used to operate the fuel injector, using the leading edge of a pulse as an injection-initiating signal and the trailing edge as an injection-terminating signal, the timing of the initiating and terminating electric signals determines the quantity of fuel injected, and may take into account any data, such as injector calibration.

Injector control module 14 may at times make certain adjustments to the desired fueling data for developing the proper pulse widths of the electric current signals supplied to the fuel injectors. One reason for injector control module 14 to make an adjustment of the desired fueling data that is supplied from controller 12 is to compensate for certain characteristics of the specific fuel injectors, such as the injector calibration mentioned above. Another reason is to compensate for prevailing conditions that otherwise would contribute to deviation of the actual amount of fuel injected from the desired amount. The desired fueling data supplied to injector control module 14 represents a certain pulse width for the signal to be applied to a fuel injector to deliver a corresponding amount of fuel to the engine cylinder based on some set of base conditions for the engine and ambient. Certain prevailing conditions may however require that the signal actually applied to a fuel injector have a pulse width different from the pulse width corresponding to the desired fueling data calculated by controller 12, in order for the desired amount of fuel to actually be injected. For example, when a cold engine is being cranked and started, the fuel injectors are also cold and may exhibit injection characteristics different from those exhibited when warmed up. Adjustment may be made by multiplying the desired fueling data by a multiplier and further by adjusting the multiplier as the fuel injectors warm up.

In FIG. 1, desired fueling data calculated by controller 12 is designated by the symbol vfdes_m. The inventive strategy presented by FIG. 1 comprises development of data m_pw_mult_adder representing a pulse width multiplier adder for adjusting the multiplier that is used to multiply the desired fueling data in order to obtain the proper pulse width for the actual electric signal applied to the fuel injector and thereby assure that the injector delivers fuel in an amount corresponding to the desired fueling data. A calculated value for the pulse width multiplier adder data m_pw_mult_adder is passed by a switch function 76 when that switch function is set. When switch function 76 is reset, the adder has zero value. At the beginning of execution of the inventive algorithm, switch function 76 is reset, causing the value of the pulse width multiplier adder data m_pw_mult_adder to be zero. Continued execution of the algorithm causes switch function 76 to be set, in turn causing pulse width multiplier adder data m_pw_mult_adder to have a calculated value obtained from a look-up table 78, as more fully described hereinafter. This will continue until switch function 76 is eventually again reset. The execution rate of the algorithm may be 10 times per second for example, in which case the desired fueling data is updated every 100 milliseconds. The value of the multiplier adder is added to the value of the multiplier, with the sum setting the width of the fuel injector pulse. Look-up table 78 provides for the value of the multiplier adder to be adjusted for different engine speeds. In general the adder value will have a higher value at lower engine speeds than at higher engine speeds. Although the value of the multiplier added could be positive or negative, it is typically positive and therefore increases the fueling.

The way in which the multiplier adder is allowed to be effective and how its value is calculated will now be explained.

A data signal sys_run supplied by controller 12 indicates that controller 12 has been powered up and is operational. A data signal Mode 2, also supplied by controller 12, indicates that engine 18 is in a Run Mode, meaning the engine has been cranked and started. When both the sys_run and Mode 2 signals are present, an AND function 50 is effective in two ways: one, to cause a wash delay timer 52 to begin to time by counting down; and two, to cause a switch function 54 to operate from reset to set.

Prior to switch function 54 being set, desired fueling data vfdes_m was one of two data inputs to a wash adder look-up table 56, the other input being data eot_can_res representing engine oil temperature. Upon switch function 54 being set, data comprising a running average of desired fuel data vfdes_m, rather than the most recently calculated value of desired fuel data vfdes_m, becomes the one input to look-up table 56.

The amount of time required for wash delay timer 52 to time out is set by a wash delay function generator 58 based on engine oil temperature data eot_can_res. Function generator 58 may serve merely to distinguish a cold engine from a warm engine by setting a certain delay when the engine is cold and eliminating the delay when the engine is warm. When timer 52 completes counting down to zero, a coincidence detection function 60 issues a data signal that is used for two purposes. One purpose is to start the timing out of a wash ramp timer 62 via an AND function 64 that utilizes the sys_run data signal as its other input, and the other is to operate another switch function 66 from reset to set via an inverting function 68.

The amount of time required for timer 62 to count down to zero is set by a function generator 70 based on engine oil temperature data eot_can_res. When timer 62 has counted down to zero, a comparison function 72 terminates a data signal that had previously been present, concurrent with the sys_run data signal, at an AND function 74 that had been keeping switch function 76 set. When the timer has timed out by counting down to zero, AND function 74 resets switch function 76, causing the value of the multiplier adder to return to its initial zero value.

As engine 18 is being cranked, controller 12 is calculating values for desired fueling data vfdes_m, and AND function 50 is holding switch function 54 reset. During cranking, the most recent calculated value of desired fueling data vfdes_m is one of the two inputs to look-up table 56, the other input being data representing engine oil temperature eot_can_res, and concurrently, the algorithm is calculating a value of the running average of desired fueling data vfdes_m (reference numeral 80).

Once engine 18 starts, the engine operating mode switches from a Crank Mode to the Run Mode. As a result, AND function 50 sets switch function 54 and at the same time initiates wash delay timer 52. The setting of switch function 54 now changes input data to look-up table 56 from the most recent calculated value of desired fueling data vfdes_m to the value of the calculated running average. Wash delay timer 52 times out over a short time interval that will end upon elapse of the delay time set by function generator 58. When that short time interval has elapsed, switch function 66 is reset. The value from look-up table 56 that was passed by switch function 66 to look-up table 78 immediately prior to resetting of switch function 66 is captured. The captured value is processed via a loop 79 that washes out the captured value over a wash ramp time determined by wash ramp timer 62. The captured value may be washed out according to any appropriate function, an example of which is an exponential decay function. While a running average is disclosed as a preferred averaging technique, any averaging technique that obtains a reasonably accurate average may be used.

The time constant for such an exponential decay function may be a fixed constant or set by a programmed input wash_ramp_div_fac, according to the setting of a switch function 82. When switch function 82 is reset, the time constant is a fixed constant. When switch function 82 is set, the time constant is set by the value of the programmed input wash_ramp_div_fac.

Figure 2:
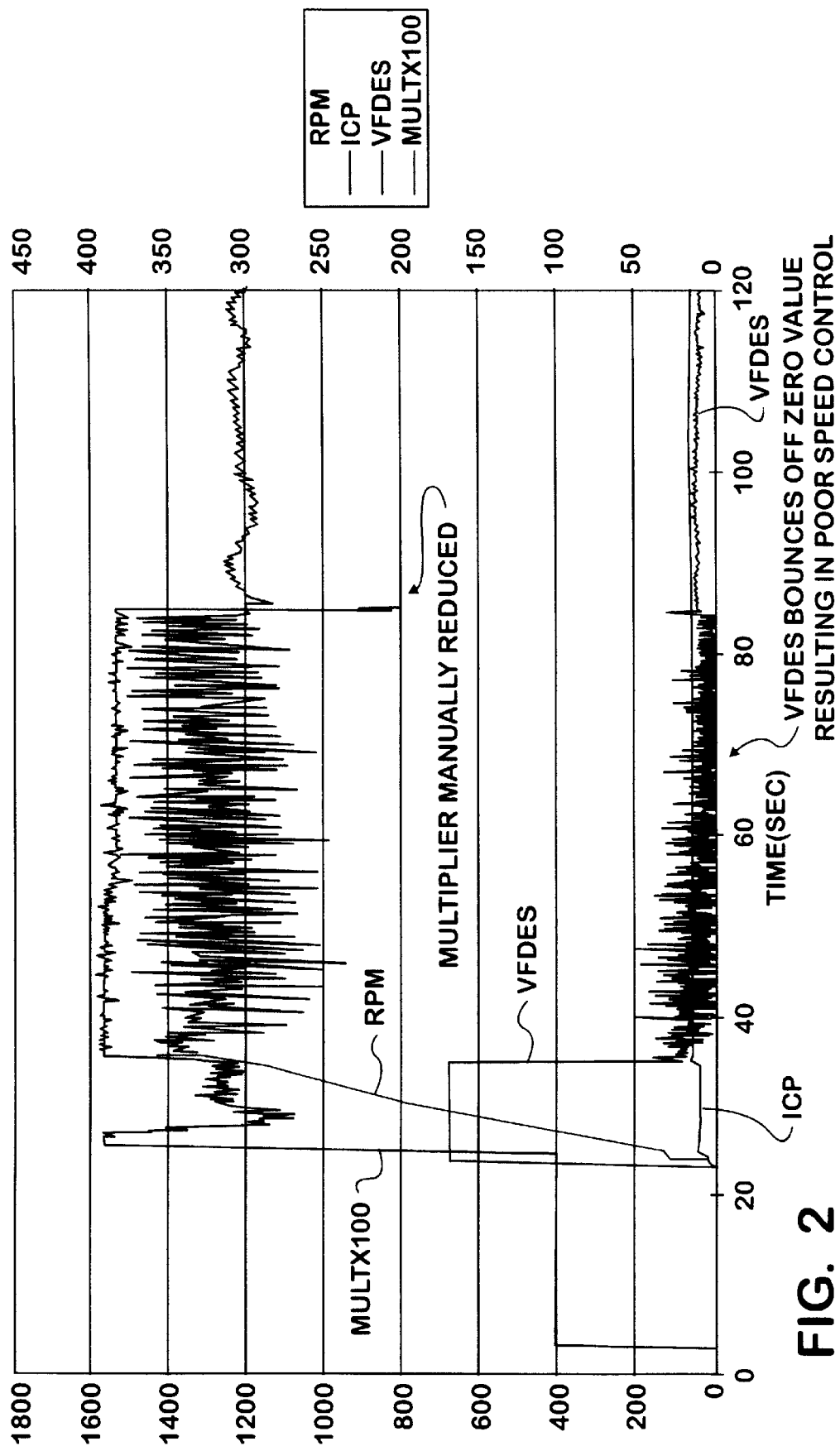
FIG. 2 is a graph plot relevant to the background of the present invention and containing traces of several variables useful in explaining the background.

FIG. 2 illustrates an example of starting an operation that lacks the multiplier adder feature of the present invention. FIG. 2 illustrates four analog signal traces as functions of time: an engine speed trace, and injection control pressure trace, a desired fueling trace, and a 100× trace of the multiplier that is used to multiply the desired fueling trace. When the engine is cranked beginning at about twenty-four seconds, desired fueling is substantially increased. When the engine starts and begins to accelerate, the multiplier is further substantially increased and is then progressively decreases as the acceleration continues. When the engine reaches idle speed desired fueling is decreased. Before desired fueling is decreased, the multiplier reverses and begins to increase. The engine speed trace shows that engine idle speed is subject to a rather substantial fluctuation spanning several hundred rpm. The fluctuations are attributed to the desired fueling trace "bouncing off" zero value, as shown. The value of the multiplier required at cranking and initial starting is too great for running idle. As a result, the governor portion of controller 12 cannot effectively reduce fuel enough to adequately maintain speed as the engine idles, and therefore the desired fueling trace "bounces off" zero. As further shown at about eighty-five seconds in FIG. 2, the fluctuations are greatly attenuated by manually reducing the multiplier. This stabilization of the desired fueling trace is attributed to elimination of the desired fueling trace "bouncing off" zero value.

Figure 3:
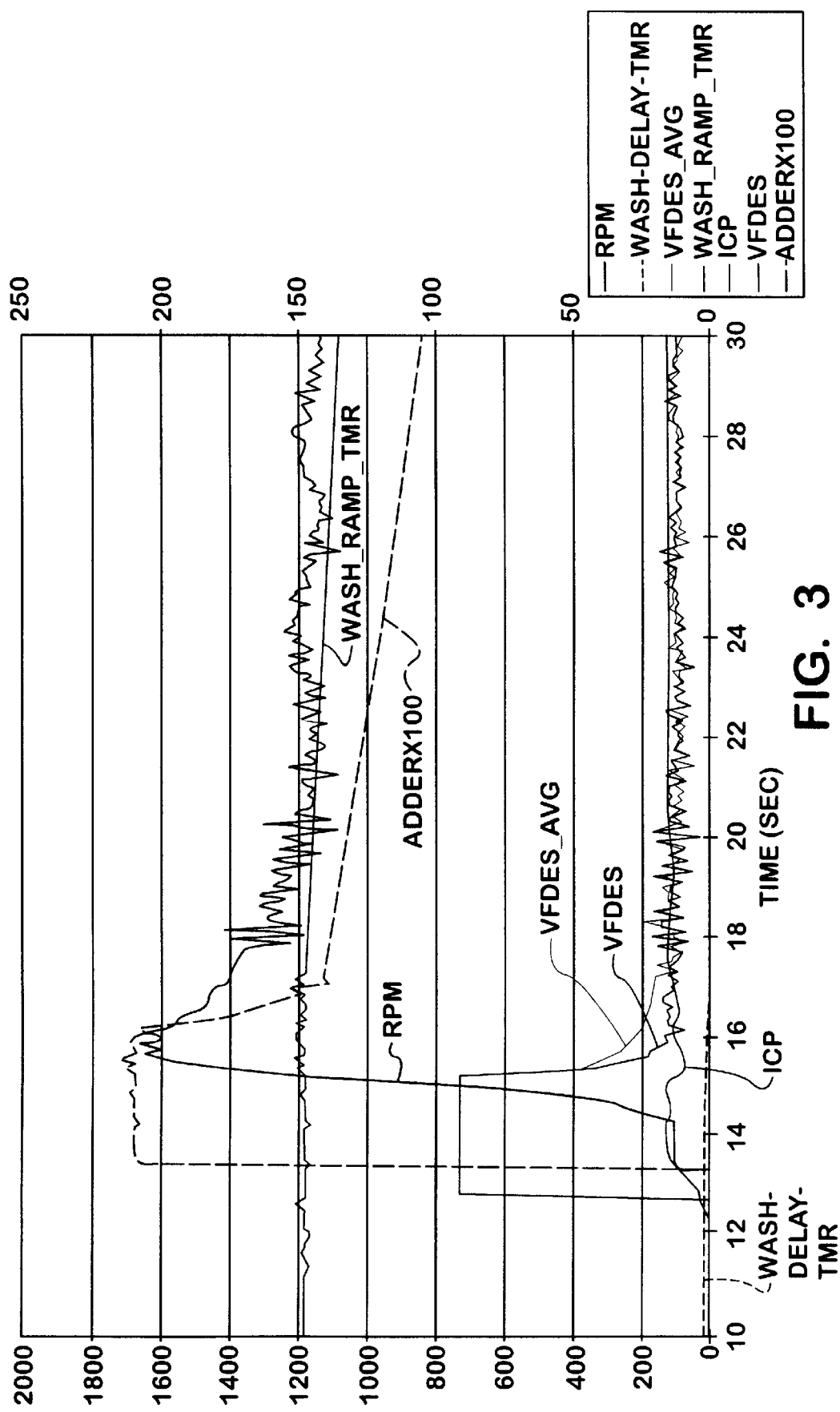
FIG. 3 is a graph plot relevant to the present invention and containing traces of several variables useful in explaining the invention.

FIG. 3 shows of a set of four traces for another example, except now the example incorporates the multiplier adder feature of the present invention. FIG. 3 shows three additional traces, namely, a wash delay timer trace, an average desired fuel trace, and a 100× multiplier adder trace. This example shows that the engine accelerates to approximately 1600 rpm and then decelerates to stabilize at an idle speed of around 1200 rpm without the substantial fluctuations shown in FIG. 2. The desired fueling trace of FIG. 3 shows no "bouncing off" zero value as in the example of FIG. 2. By using a running average of the desired fueling data, the multiplier is rendered appropriate for initial engine idle running without compromising the required multiplier for cranking and initial starting, and the multiplier adder compensates for cold fuel injectors and is washed out as they warm up.

Figure 4:
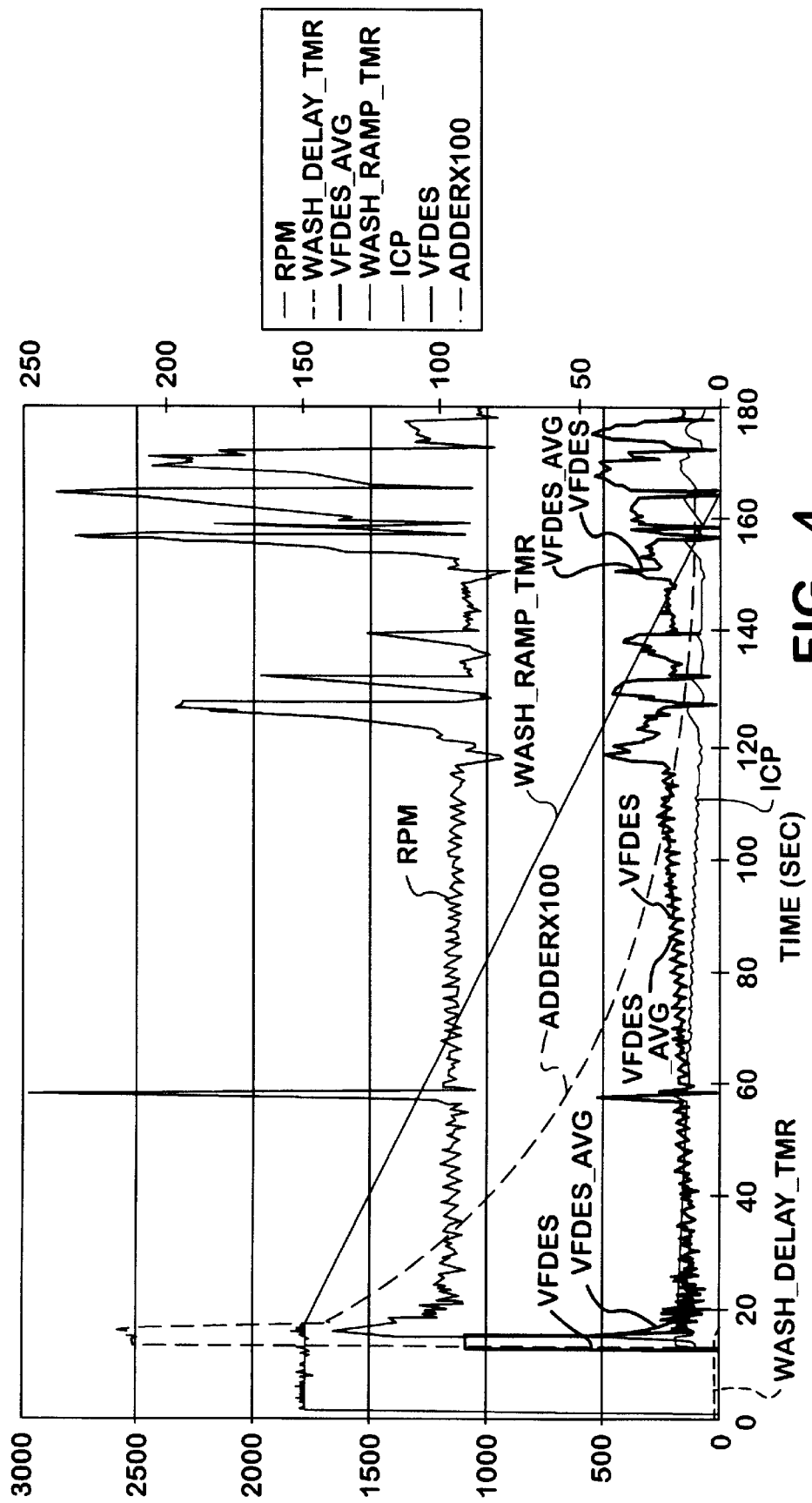
FIG. 4 is another graph plot relevant to the present invention and containing traces of several variables.

FIG. 4 illustrates still another example utilizing the multiplier adder feature of the present invention.

Figure 5:
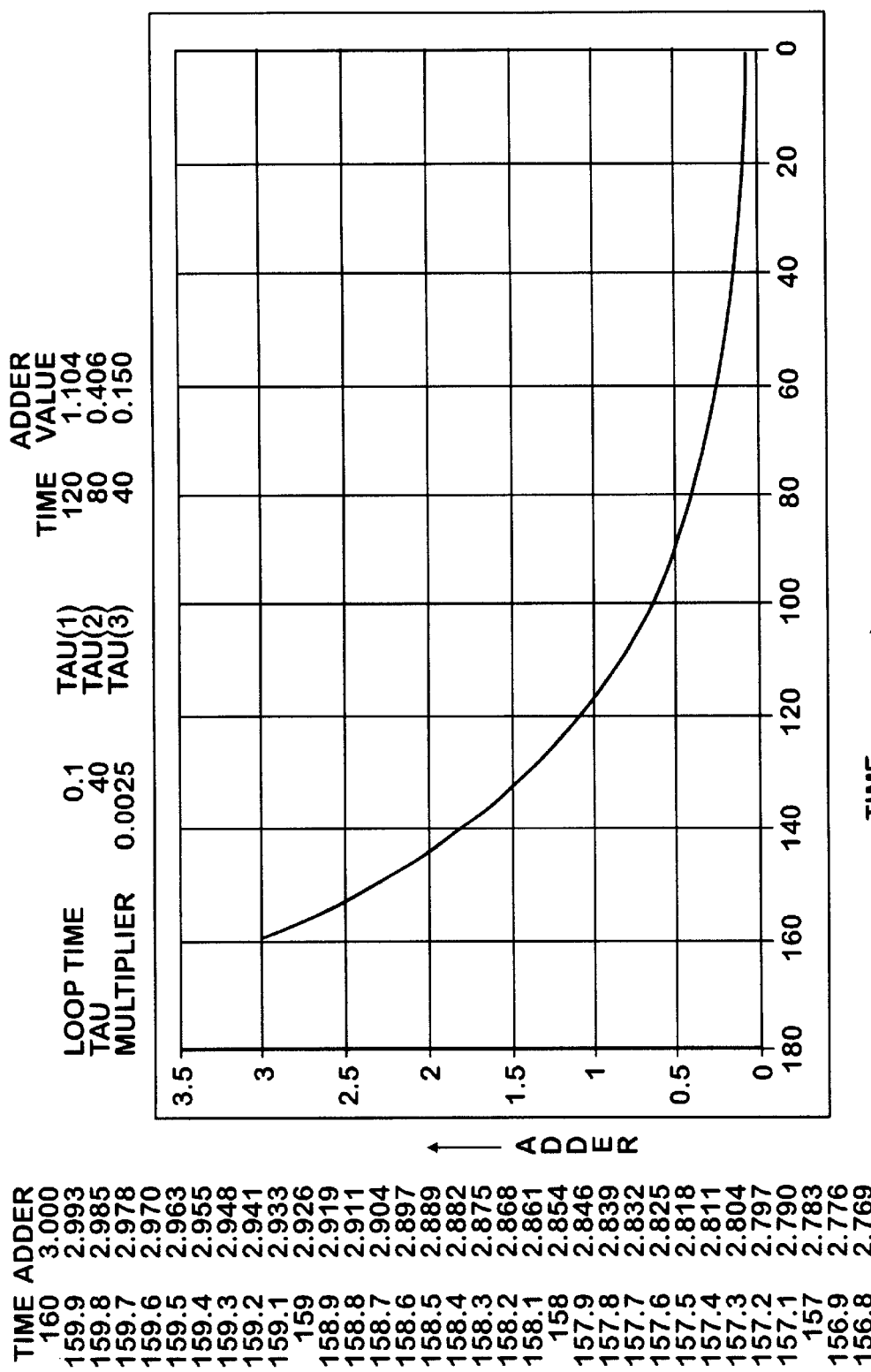
FIG. 5 is a table and graph plot for a particular example of the present invention.

FIG. 5 is an example of the exponential decay function that washes the multiplier adder. At the beginning of washing, the value of the multiplier adder has a value of 3.000. That value is progressively washed toward a final value of zero. As shown by FIG. 5 the multiplier adder value washes from its initial value to a value of 1.104 after one time constant, a value of 0.406 after two time constants, and a value of 0.150 after three time constants. Because the actual wash time is established by wash ramp timer 62, the time for which the exponential decay function is allowed to be effective is a function of the time required for that timer to count down to zero. Because function generator 70 makes the wash time a function of engine temperature, the time for which the exponential decay is allowed to be effective is a function of engine temperature. In general, the lower the engine temperature, the longer the wash time.

Look-up table 78 makes the value of the multiplier adder a function of engine speed. In general, the multiplier adder value will be adjusted downward with increasing engine speed. Although engine temperature and engine speed are factors that affect the multiplier adder and its use, the use of the running average of the desired fueling calculated by controller 12 can account for different engine starting conditions that are not-temperature dependent. For example, if cranking of the engine is discontinued before the engine starts, the starting condition that prevails when the engine is re-cranked can be different even though the engine temperature is unchanged.

While a presently preferred embodiment of the invention has been illustrated and described, it should be appreciated that principles of the invention apply to all embodiments falling within the scope of the following claims.

What is claimed is:

1. An internal combustion engine comprising:
    a processor-based engine control system; and
    a fueling system that fuels the engine under control of the engine control system;
    wherein the control system processes data to develop desired fueling data representing a desired amount of fuel for fueling the engine, modifies the desired fueling data by a multiplier during cranking, starting, and initial running phases of the engine, causes the fueling system to fuel the engine according to the modified desired fueling data during the cranking, starting, and initial running phases of the engine, and thereafter modifies he multiplier by a multiplier adder and causes the fueling system to fuel the engine according to the modified desired fueling data as further modified by the multiplier adder, in which the control system causes the value of t e multiplier adder to be a function of the value of an average of desired fueling data taken over a time interval that includes time prior to the initial running phase of the engine.

2. An internal combustion engine as set forth in claim 1 in which the control system causes the time interval over which the value of the average of desired fueling data is taken to extend into the initial running phase of the engine.

3. An internal combustion engine as set forth in claim 2 in which the control system causes the multiplier adder to be washed out during a washing out time interval according to a decaying exponential function applied to the value of the average of desired fueling data captured at the end of a wash delay time interval that precedes the washing out time interval.

4. An internal combustion engine as set forth in claim 2 in which the control system causes the value of the multiplier adder to also be a function of engine speed.

5. An internal combustion engine comprising:
    a processor-based engine control system; and
    a fueling system that fuels the engine under control of the engine control system;
    wherein the control system processes data to develop desired fueling data representing a desired amount of fuel for fueling the engine, modifies the desired fueling data by a multiplier during cranking, starting and initial running phases of the engine, causes the fueling system to fuel the engine according to the modified desired fueling data during the cranking, starting, and initial running phases of the engine, and thereafter modifies the multiplier by a multiplier adder and causes the fueling system to fuel the engine according to the modified desired fueling data as further modified by the multiplier adder, in which the control system comprises a look-up table containing multiplier adder values correlated wit sets of values of engine temperature and desired fueling data and selects a value for the multiplier adder from th look-up table according to engine temperature and desired fueling data.

6. An internal combustion engine as set forth in claim 5 in which control system causes the desired fueling data to be an input to the look-up table during the cranking and initial running phases of the engine and is replaced by the average of desired fueling data after the initial running phase.

7. An internal combustion engine as set forth in claim 5 including an additional look up table for adjusting the selected value for the multiplier adder for engine speed.

8. An internal combustion engine comprising;
    a processor-based engine control system; and
    a fueling system that fuels the engine under control of the engine control system;
    wherein the control system processes data to develop desired fueling data representing a desired amount of fuel for fueling the engine, modifies the desired fueling data by a multiplier during cranking, starting, and initial running phases of the engine, causes the fueling system to fuel the engine according to the modified desired fueling data during the cranking, starting, and initial running phases of the engine, and thereafter modifies he multiplier by a multiplier adder and causes the fueling system to fuel the engine according to the modified desired fueling data as further modified by the multiplier adder, in which after the initial running phase of the engine, the control system causes the value of the multiplier adder to be a function of the value of a running average of desired fueling data taken over a time interval that includes time prior to the initial running phase of the engine.

9. An internal combustion engine as set forth in claim 8 in which the control system causes the time interval over which the value of the running average of desired fueling data is taken to extend into the initial running phase of the engine.

10. An internal combustion engine comprising:
    a processor-based engine control system; and
    a fueling system that fuels the engine under control of the engine control system;
    wherein the control system processes data to develop desired fueling data representing a desired amount of fuel for fueling the engine, modifies the desired fueling data by a modifier and causes the fueling system to fuel the engine according to the modified desired fueling data during cranking, starting, and initial running phases of the engine, and thereafter further modifies the modifier by a further modifier derived from averaging desired fueling data taken over a time interval that includes time prior to the initial running phase of the engine and causes the fueling system to fuel the engine according to the further modified modifier.

11. An internal combustion engine as set forth in claim 10 in which the control system causes the time interval over which the value of the running average of desired fueling data is taken to extend into the initial running phase of the engine.

12. A method of fueling an internal combustion engine that has a processor-based engine control system and a fueling system that fuels the engine under control of the engine control system, the method comprising: processing data to develop desired fueling data representing a desired amount of fuel for fueling the engine, modifying the desired fueling data by a multiplier during cranking, starting, and initial running phases of the engine, causing the fueling system to fuel the engine according to the modified desired fueling data during the cranking, starting, and initial running phases of the engine, and thereafter modifying he multiplier by a multiplier adder and causing the fueling system to fuel the engine according to the modified desired fueling data as further modified by the multiplier adder, including deriving the value of the multiplier adder from an average of desired fueling data taken over a time inter al that includes time prior to the initial running phase of the engine.

13. A method as set forth in claim 12 in which the step of deriving the value of the multiplier adder from an average of desired fueling data taken over a time interval that includes time prior to the initial running phase of the engine control system also includes time extending into the initial running phase of the engine as part of the time interval.

14. A method as set forth in claim 13 including causing the multiplier adder to be washed out during a washing out time interval according to a decaying exponential function applied to the value of the average of desired fueling data captured at the end of a wash delay time interval that precedes the washing out time interval.

15. A method as set forth in claim 12 including causing the value of the multiplier adder to also be a function of engine speed.

16. A method of fueling an internal combustion engine that has a processor-based engine control system and a fueling system that fuels the engine under control of the engine control system, the method comprising:

processing data to develop desired fueling data representing a desired amount of fuel for fueling the engine, modifying the desired fueling data by a multiplier during cranking, starting, and initial running phases of the engine, causing the fueling system to fuel the engine according to the modified desired fueling data during the cranking, starting, and initial running phases of the engine, and thereafter modifying the multiplier by a multiplier adder and causing the fueling system to fuel the engine according to the modified desired fueling data as further modified by the multiplier adder, in which the value for the multiplier adder is selected according to engine temperature and desired fueling data from a look-up table containing multiplier adder values correlated with sets of values of engine temperature and desired fueling data.

17. A method as set forth in claim 16 including causing the desired fueling data to be an input to the look-up table during the cranking and initial running phases of the engine, and after the initial running phase replacing the input by the average of desired fueling data.

18. A method as set forth in claim 16 in which the selected value for the multiplier adder is used as an input to a further look-up table that also uses engine speed as an input to adjust the selected value for the multiplier adder for engine speed.

19. A method of fueling an internal combustion engine that has a processor-based engine control system and a fueling system that fuels the engine under control of the engine control system, the method comprising:

processing data to develop desired fueling data representing a desired amount of fuel for fueling the engine, modifying the desired fueling data by a multiplier during cranking, starting, and initial running phases of the engine, causing the fueling system to fuel the engine according to the modified desired fueling data during the cranking, starting, and initial running phases of the engine, and thereafter modifying the multiplier by a multiplier adder and causing the fueling system to fuel the engine according to the modified desired fueling data as further modified by the multiplier adder, including, after the initial running phase of the engine, causing the value of the multiplier adder to be a function of the value of a running average of desired fueling data taken over a time interval that includes time prior to the initial running phase of the engine.

20. A method as set forth in claim 19 including causing the time interval over which the value of the running average of desired fueling data is taken to extend into the initial running phase of the engine.

21. A method of fueling an internal combustion engine that has a processor-based engine control system and a fueling system that fuels the engine under control of the engine control system, the method comprising:

processing data to develop desired fueling data representing a desired amount of fuel for fueling the engine, modifying the desired fueling data by a modifier and causing the fueling system to fuel the engine according to the modified desired fueling data during cranking, starting, and initial running phases of the engine, and thereafter further modifying the modifier by a further modifier derived from averaging desired fueling data taken over a time interval that includes time prior to the initial running phase of the engine and causing the fueling system to fuel the engine according to the further modified modifier.

22. A method as set forth in claim 21 including causing the time interval over which the value of the running average of desired fueling data is taken to extend into the initial running phase of the engine.

* * * * *